United States Patent [19]
Backus

[11] Patent Number: 5,235,776
[45] Date of Patent: Aug. 17, 1993

[54] FISHING LINE FLOATER

[76] Inventor: Harry A. Backus, 4269 Clifford Rd., Cincinnati, Ohio 45236

[21] Appl. No.: 892,048

[22] Filed: Jun. 2, 1992

Related U.S. Application Data

[63] Continuation-in-part of Ser. No. 706,180, May 28, 1991, abandoned.

[51] Int. Cl.⁵ ............................................. A01K 93/00
[52] U.S. Cl. .................................. 43/43.11; 43/44.87; 43/44.9; 43/44.91
[58] Field of Search ................... 43/44.91, 44.9, 44.92, 43/43.11, 43.87

[56] References Cited

U.S. PATENT DOCUMENTS

| | | | |
|---|---|---|---|
| 584,615 | 6/1897 | Wilson . | |
| 1,606,240 | 11/1926 | Klaserner . | |
| 1,973,028 | 9/1934 | Thomas . | |
| 2,019,630 | 11/1934 | Peeso . | |
| 2,177,697 | 10/1939 | Fairbanks . | |
| 2,190,113 | 2/1940 | Chreitzberg . | |
| 2,274,380 | 2/1942 | Pool . | |
| 2,479,642 | 8/1949 | Schiffmann | 43/43.11 |
| 2,492,033 | 12/1949 | Cherriere . | |
| 2,603,905 | 7/1952 | Brezezinski . | |
| 2,646,643 | 7/1953 | Nordlund . | |
| 2,669,054 | 2/1954 | Smith . | |
| 2,693,049 | 11/1954 | Atton . | |
| 2,728,161 | 12/1955 | Mangel et al. | 43/43.11 |
| 2,984,040 | 5/1961 | Fogaley . | |
| 3,057,107 | 10/1962 | Finnicum | 43/43.11 |
| 3,141,256 | 7/1964 | McBriar | 43/43.11 |
| 3,169,339 | 2/1965 | Ekstrand | 43/43.11 |
| 3,192,661 | 7/1965 | Tyrrell . | |
| 3,341,965 | 9/1967 | Purcella . | |
| 3,364,613 | 1/1968 | Sewell | 43/43.11 |
| 3,425,151 | 2/1969 | Salfer . | |
| 3,800,460 | 4/1974 | Holder . | |
| 3,977,115 | 8/1976 | Check | 43/44.87 |
| 4,251,941 | 2/1981 | Howard . | |
| 4,672,769 | 6/1987 | Thompson | 43/43.11 |

*Primary Examiner*—Kurt C. Rowan
*Attorney, Agent, or Firm*—Wood, Herron & Evans

[57] ABSTRACT

A fishing floater is controllably slidable along a fishing line to automatically assure that a fishing hook connected adjacent an end of the line will be located close to the bottom of the water when fishing, regardless of whether the depth of the water is known. The floater includes a guide or frame member with a pair of spaced guides and an eccentrically weighted, buoyant hub which is rotatably connected to the guide member between the spaced guides. The fishing line extends through one of the guideways, around the hub and then through the outer guideway. With a weight attached to an end of the line and a hook spaced a short distance from the weight, gravity causes the weight and line to sink to the bottom, thereby pulling the line through the floater by rotation of the hub with respect to the guide member. When the weight hits the bottom, hub rotation stops. The weighing and/or shape of the hub provides upward tension on the line which, in cooperation with the downward tension of the weight, holds the hook close to the bottom.

14 Claims, 3 Drawing Sheets

FISHING LINE FLOATER

This patent application is a continuation-in-part application of applicant's U.S. patent application Ser. No. 07/706,180, filed on May 28, 1991 and entitled "Novel Depth Gauge and Floater for Fishing", now abandoned.

FIELD OF THE INVENTION

This invention relates to a floater used in combination with a fishing line.

BACKGROUND OF THE INVENTION

A conventional fish floater, sometimes referred to as a bobber, normally attaches firmly to a fishing line a predetermined distance from the end of the fishing line. With a fishing hook secured at or near the end of the fishing line, the bobber floats on the surface of the water and holds the hook a predetermined distance under the surface. When a fish strikes the bait, or the lure, the fish pulls the line downwardly, thereby pulling the floater under the surface of the water. Thus, the floater holds the hook a desired distance below the water surface and serves as an indicator of a strike.

Many fish seek their food at or near the bottom of the lake, river, stream, or pond in which they live. Accordingly, it is desirable to fish with the hook placed close to the bottom. For a known depth, this is accomplished by attaching the floater to the line a distance from the end which is slightly less than the known depth. This assures that the hook will be held close to the bottom but will not drag or rest upon the bottom. If the fisher fishes in a body of water which has different depths, the floater must be detached from the line and then reattached again in the proper position each time the fishing location changes. This represents an inconvenience to fishermen, particularly when fishing from a boat, where winds may cause the boat to drift.

Moreover, a fisher seldom knows the depth of the body of water in which he or she is fishing, either because of unfamiliarity with the body of water or the multiple depth variations in relatively larger bodies of water. Thus, the fisher does not know where to initially attach the floater. Unless the fisher performs at least one depth test, there exists no simple and effective way to determine where to attach a floater to a fishing line to assure that the hook is close to the bottom.

It is an objective of this invention to eliminate the need for a fisher to know a water depth to effectively locate a fish hook near the bottom.

It is another objective of the invention to eliminate the need to detach and reattach a floater to a fishing line every time fishing occurs at a different depth.

The objectives of this invention are met by a floater which slides along a fishing line to adjust automatically to different water depths.

More particularly, the above stated objectives are met by a floater with a two-piece construction which includes a guide or frame member and a buoyant, eccentrically weighted hub rotatably connected to the guide member. The guide member includes two spaced guideways through which the fishing line passes The hub resides between the guideways and includes a peripheral depression, or groove, about which the fishing line is wrapped once.

Preferably, the guide member is elongated, and has two tubular portions aligned along an axis. The hub is rotatable about a second axis which is parallel with the water surface and perpendicular to the first axis. At all times, the hub maintains the groove in alignment with the first axis. The fishing line extends through the top guideway, once or twice around the hub along the peripheral groove and then outwardly through the bottom guideway. With tension on the line from either direction, the hub will rotate.

In use, the fishing line is extended through one guideway, wrapped once around the hub along the groove and then extended out the bottom guideway. A weight, or sinker, is attached to an end of the fishing line, and a hook is located adjacent the weight. When placed into the water, either by casting or feeding the line, the weight will gradually sink and pull the hook and the line downwardly until the weight contacts the bottom. The weight will sink gradually because of the eccentric weighing of the hub with respect to the axis of rotation. During downward movement, the weight pulls the line through the guideways and along the groove of the rotating hub.

When the weight contacts the bottom, the pulling force on the line stops, and the hub stops rotating. Immediately thereafter, the weighing and/or the buoyancy of the hub causes up to one additional half turn about the rotation axis, during which time the line slides along the groove. This places a slight upwardly directed force on the line which, in combination with the downward force of the weight, holds the line taut with the hook located above the bottom. The guide member may be oriented vertically, or tilted slightly at an angle.

When a fish strikes the hook, the initial pulling motion will cause the hub to rotate with respect to the guide member. Because of the preferable elongated shape of the hub with respect to its axis of rotation, hub rotation creates ripples upon the surface of the water to indicate to the fisherman that a strike has occurred. Depending upon the force and direction of the pulling motion, the guide member may also bob up and down on the surface of the water. During light nibbles or slight disturbances, the guide member may tilt somewhat.

This inventive floater may be formed from any buoyant material which is not subject to degradation from extended us in water. The hub should be made of a material which is nonslidable with respect to nylon fishing line. The bottom of the groove may be scored crosswise or roughened to provide the right texture.

This inventive floater provides several advantages over prior floaters. First, because this floater is slidably connected to the fishing line, it is not necessary for a fisher to know the depth of the water to attach the floater to the fishing line at a position which will locate the hook near the bottom. The floater allows the weight at the end of the line to find the bottom gradually and automatically. Secondly, the combination of upward and downward forces holds the line relatively taut, with the hook near the bottom. Finally, rotation of the elongated shaped hub creates disturbances upon the surface of the water to provide an accurate indication of when a strike has occurred, with minimal false alarms.

These and other features of the invention will be more readily understood in view of the following detailed description and the drawings.

DETAILED DESCRIPTION OF THE DRAWINGS

Figure 1:
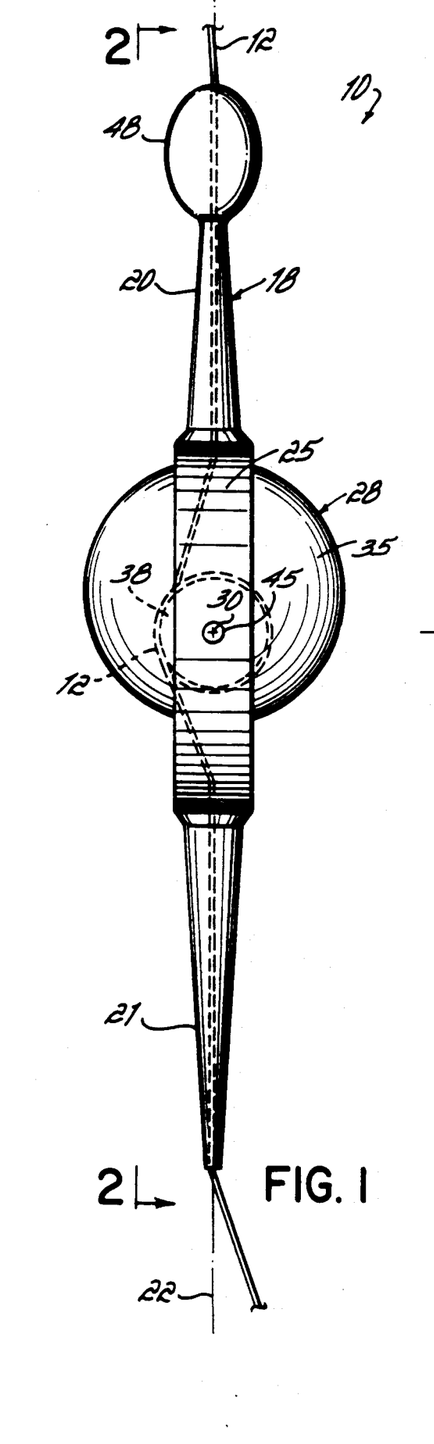
FIG. 1 is a vertical side elevation of a fishing line floater in accordance with one preferred embodiment of the invention.
Figure 1A:
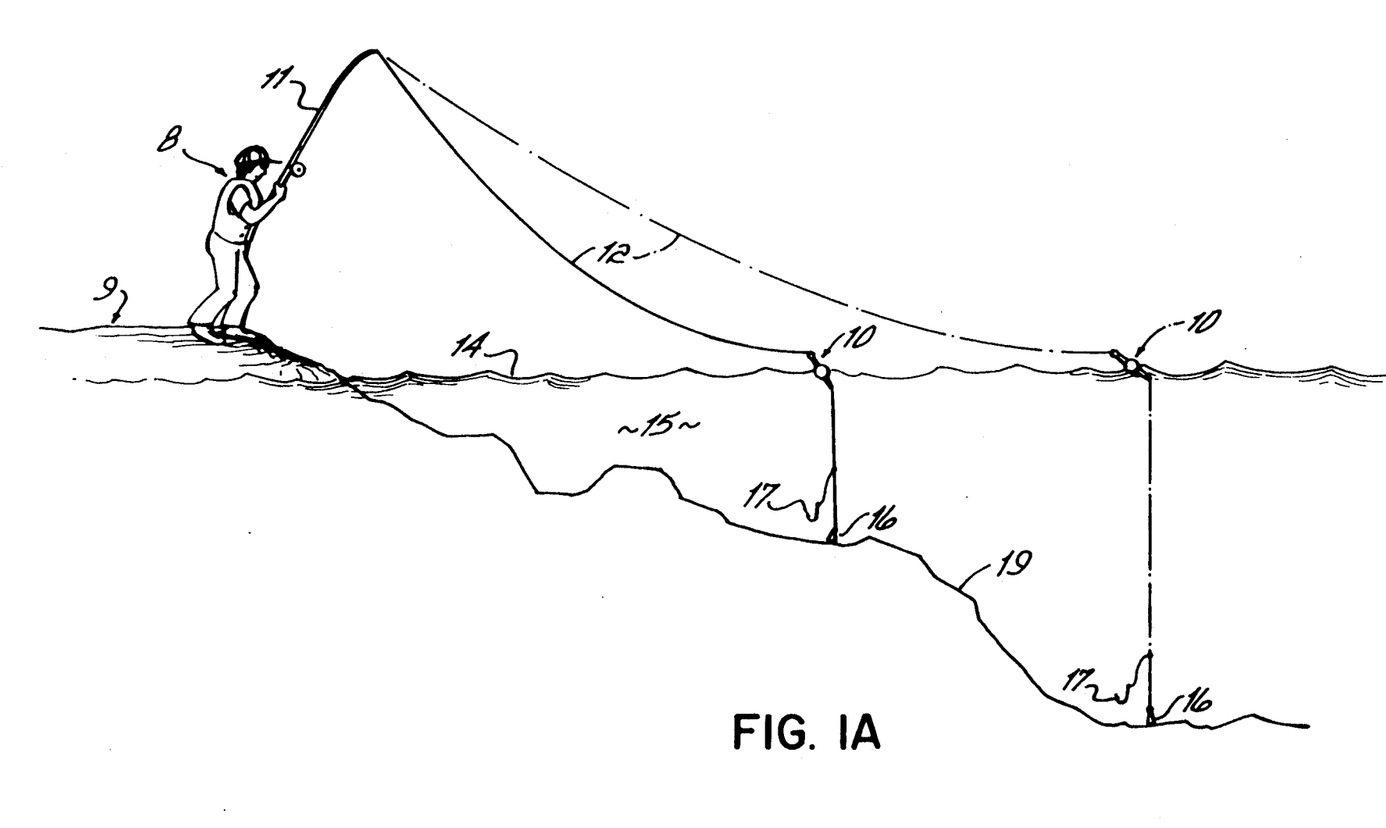
FIG. 1A is a schematic which illustrates the principles of a fishing floater constructed in accordance with the invention.

FIG. 1A illustrates the principle of a fishing line floater 10 constructed according to this invention. FIG. 1 shows a fisher 8 standing on a bank 9. The fisher 8 holds a fishing rod 11 which has a fishing line 12 attached thereto. The line extends below a surface 14 of the water 15. The floater 10 is slidably connected to the fishing line 12. A sinker, or weight 16 is tied to a bottom end of the fishing line 12. A hook 17 is attached to the line 12 above the weight 16 to remain spaced above the bottom surface 19 of the water 15. FIG. 1 also shows, in phantom, the same line 12 but located for fishing at a different depth.

According to one preferred embodiment, shown in FIG. 1, the floater 10 includes a guide member 18 with an upper tubular portion 20 and a lower tubular portion 21. Preferably, the guide member 18 is elongated and upper portion 20 and lower portion 21 are aligned along a longitudinal axis 22. Upper portion 20 and lower portion 21 are interconnected by a pair of spaced, substantially parallel sides, 24 and 25, which are shown more clearly in FIG. 2. A buoyant hub 28 is rotatably connected to guide member 18 at sides 24 and 25. The hub 28 is rotatable about an axis 30 which is perpendicular to longitudinal axis 22.

The hub 28 is eccentrically weighted with respect to rotational axis 30. To provide eccentric weighing, the hub 28 is preferably elongated in shape, with an oval, elongated, or egg-shape. Additionally, or alternatively, the hub 28 may be spherical in shape, but weighted on one side, or the hub may be symmetrical in shape but eccentrically mounted with respect to axis 30. The eccentric weighing of the hub 28 assures that, during rotation, the moment of inertia about axis 30 is nonuniform. The eccentric weighing promotes gradual letting out of the fishing line 12 from the floater 10 as the weight 16 sinks toward the bottom 19.

The eccentric weighing of the hub 28 also provides upwardly directed tension to hold the line 12 taut. With one or more fishhooks 17 secured to the line 12 adjacent the weight 16, the cooperative interaction of the downward force from the weight 16 and the upward force from the eccentric weighing of the hub 28 assures that the hooks 17 will remain relatively close to the bottom 19. This distance from the hooks 17 to the bottom 19 is dictated by the distance along the line 12 between the hooks 17 and the weight 16.

The hub 28 includes a depression or groove 32 which extends about axis 30. Preferably, this depression 32 is aligned with axis 22. The hub 28 may be a single piece construction or it may include a pair of symmetric, relatively large spheroids 34 and 35 connected to opposite ends of a spool 38, with an axle 40 extending through the center of the spheroids 34 and 35 and the spool 38. At opposite ends, the axle 40 may be connected to sides 24 and 25 by screws 44 and 45, respectively, rivets, or any other connecting mechanism which permits relative rotational movement about axis 30.

The guide member 18 may include an upper bulb 48, which may be either hollow or solid. The guide member 18 may also include a weight 49 connected to lower portion 21. The bulb 48 and the weight 49 cooperate to assure that the floater 10 will float on the surface of the water with guide member 18 oriented in a substantially vertical position. Guide member 18 may be molded as a single piece, or may include additional inner tubular pieces 50 and 51 with smooth interior surfaces to facilitate sliding of the fishing line 12 through upper portion 20 and lower portion 21, respectively.

Figure 2:
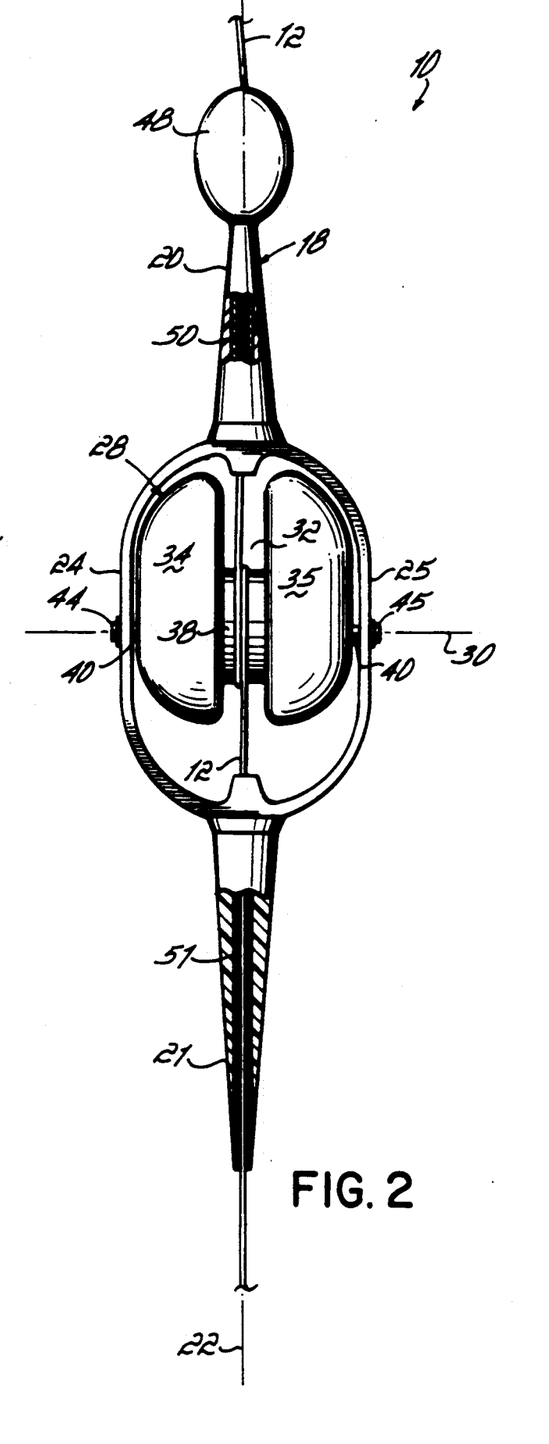
FIG. 2 is a side elevational view partially in cross-section.

As shown in FIGS. 1 and 2, the fishing line 12 extends through upper portion 20, and is seated within the circumferential depression 32 in hub 28. The line 12 wraps around the hub 28 at least once, preferably no more than three or four times, and then extends further downwardly through lower portion 21 and out the bottom of the floater 10. The number of wraps of the line 12 around hub 28 will depend on the coefficient friction of the hub 28 with respect to nylon fishing line 12, or whatever other material is used for the line 12. The line 12 should be nonslidable with respect to the hub 28 when tension is applied. Tension on the line 12 should cause rotation of the hub 28, rather than sliding of the line 12 along the groove 32. One wrap of line 12 around hub 28 should work for this purpose, though additional wraps may be necessary.

While the water 15 is shown in FIG. 2 as some distance from the bottom end of the floater 10, it is to be understood that lower portion 21 will be submerged under the water 15 when in use. The water surface 14 will intersect hub 28.

Because hub 28 rotates with respect to guide member 18, the position of this floater 10 with respect to the fishing line 12 is not fixed, but varies according to the tensional forces applied to either end. When the line 12 is placed in the water 15, with the weight 16 and the floater 10 connected thereto, gravitational forces acting upon the weight 16 will cause the weight 16 to sink and pull the line 12 downwardly, through the upper portion 20, around the hub 28 and through lower portion 21. In relative terms, with respect to the weight 16, the floater 10 moves upwardly along the fishing line 12. The movement is gradual because the eccentric weighing of the hub 28 about axis 30 variably counteracts the force of gravity applied to hub 28 about the same axis 30.

The fishing line 12 continues to pull through the floater 10 until the weight 16 contacts the bottom 19. At this point, rotation of the hub 28 with respect to guide member 18 temporarily stops. Shortly thereafter, due to the eccentric weighing, the hub 28 rotates about axis 30 up to one additional half turn. If the hub 28 is elongated, the hub 28 will rotate to a position wherein the elongation is substantially perpendicular with the surface 14. If the hub 28 includes additional weights to provide eccentric weighing, the weights will gradually rotate to the lowest position possible. As the hub 28 slowly rotates into this position, slack is removed from fishing line 12. When finally at rest, the eccentric weighing of the hub 28 places some tension on the top of the fishing line 12. This upward tension, along with the downward tension from the weight 16, holds line 12 taut and assures that the one or more fishhooks 17 will be held close to the bottom 19.

Thus, this inventive floater 10 eliminates the need for the fisherman to know the depth of the water 15 in order to assure that the fishhooks 17 will be positioned close to the bottom 19. Because this floater 10 is movable along the line 12, the fisherman is not required to continually disconnect and reconnect an indicating device to the fishing line 12 when water depth changes. Finally, because of the preferable, elongated shape of the hub 28, when a fish strikes the hook, downward tension on line 12 will rotate the hub 28 and create surface disturbances on the water 14. These surface disturbances provide a fairly sensitive indication that a strike has occurred.

While FIGS. 1 and 2 show one preferred embodiment of the invention, it is to be understood that numerous other embodiments may also be possible. For instance, it is not necessary that the guide member 18 include elongated, tubular members aligned along the same axis. Guide member 18 may simply include a pair of spaced holes in a frame which surrounds the hub 28.

Figure 3:
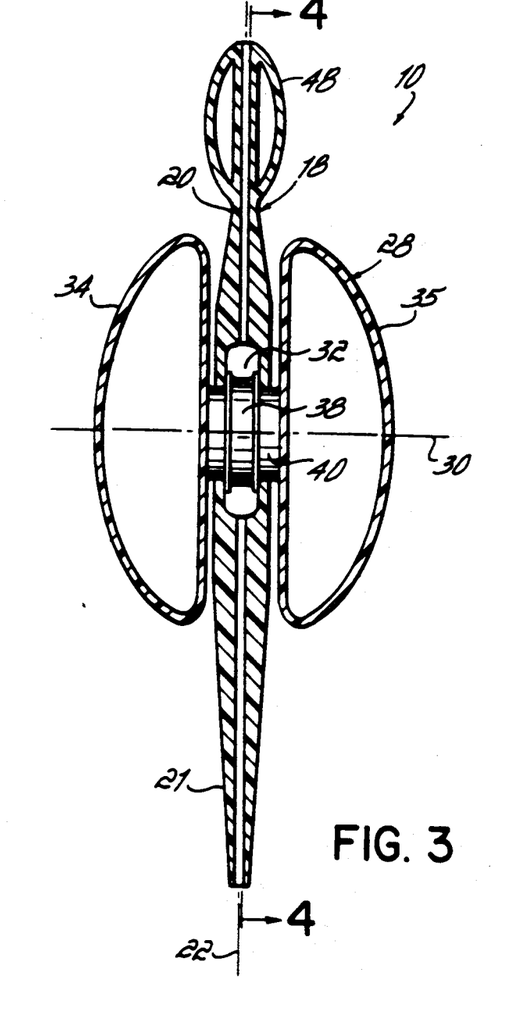
FIG. 3 is a cross-sectional view of a fishing line floater constructed in accordance with another embodiment of the invention.
Figure 4:
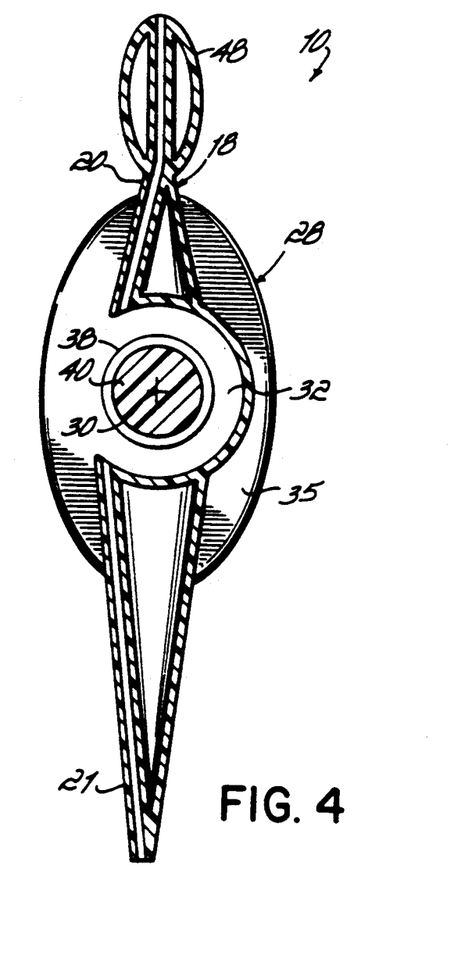
FIG. 4 is a cross-sectional view taken along lines 4—4 of FIG. 3.

Additionally, it is not necessary that upper portion 20 and lower portion 21 be aligned along the same axis. In fact, it may be desirable to guide the fishing line 12 along an angled pathway to better accommodate wrapping around the hub 28 without any entanglement. This feature is shown in the floater depicted in FIGS. 3 and 4. The floater 10 shown in FIGS. 3 and 4 has the arms 24 and 25 locate inside hollow spheroids 34 and 35.

With respect to the hub 28, it is noted that while eccentric weighing is considered critical to holding the fishing line 12 in a taut position, eccentric weighing does not necessarily require that the hub 28 itself be elongated. Hub 28 may be symmetric with respect to its rotational axis, but simply with a weight secured to one side thereof. However, with this approach, the surface disturbances created by rotation of the hub 28 would be of significantly less magnitude. For this reason, the preferable embodiments of the invention include eccentric weighing by the use of an elongated hub 28, or an elongated hub 28 with an additional weight attached to the middle.

Figure 5:
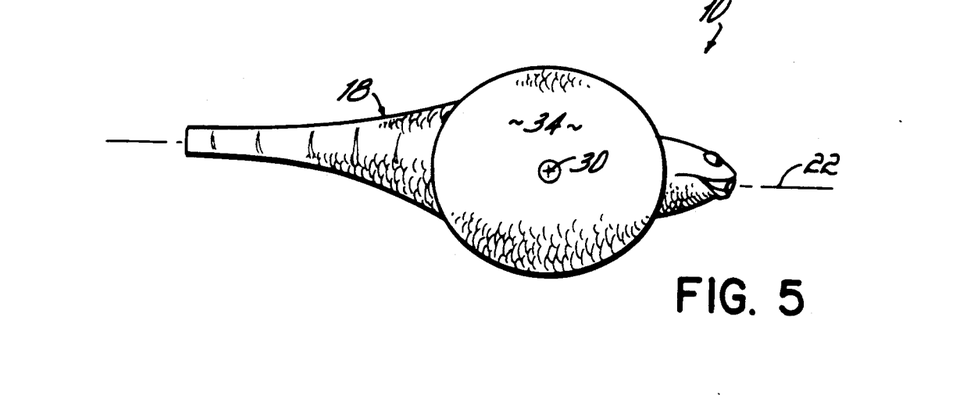
FIG. 5 is a side view of another embodiment of the invention.

FIG. 5 illustrates another alternative embodiment of the invention. In this figure, the guide member 18 and the hub 28 may be shaped to look like an animal, such as a dragon fly or insect, or any other shape commonly associated with fishing or fishing tackle.

Having described the invention in the context of illustrated and preferred embodiments, those skilled in the art will appreciate that variation may be made without departing from the concepts of the invention.

I claim:

1. A fishing floater for use with a fishing line to assist a fisher when fishing in water of unknown depth, the invention comprising:
    a guide member, the member having two spaced guideways aligned substantially along a single guide axis and through which the fishing line may be extended; and
    a buoyant hub rotatably connected to the guide member between the two spaced guideways and in alignment with the guide axis, the hub being rotatable about a rotation axis which is perpendicular to the guide axis and eccentrically weighted with respect to the rotation axis and having a depression extending about the rotation axis, the depression substantially aligned with the guide axis, whereby a single fishing line may be extended through one of the guideways, wrapped around the hub at the depression and extended out the other of the guideways to connect the floater to the line in the manner which permits movement of the floater along the line so that, when weighted, a forward end of the line will sink until contacting a bottom surface and will pull the single line through the guideways while sinking.

2. The fishing floater of claim 1 wherein the guide member further comprises:
    a pair of tubular portions.

3. The fishing floater of claim 1 wherein the guide member is elongated along the guide axis and includes a bulb at one end thereof.

4. The fishing floater of claim 3 wherein the guide member includes a weighted bottom end which cooperatively interacts with the bulb to float the guide member on water with the guide axis oriented substantially vertical with respect to the surface of the water.

5. The fishing floater of claim 2 wherein the tubular portions are angled to direct the fishing line toward the hub.

6. The fishing floater of claim 1 wherein the eccentric weighing of the hub is due to the external shape of the hub.

7. The fishing floater of claim 6 wherein the hub is elongated.

8. The fishing floater of claim 6 wherein the hub is egg-shaped.

9. The fishing floater of claim 1 wherein the hub is round and includes a weight secured to one side thereof to provide eccentric weighing with respect to the rotation axis.

10. The fishing floater of claim 1 wherein the hub is elongated in shape and also includes a weight secured to one side thereof to provide eccentric weighing with respect to the rotation axis.

11. The fishing floater of claim 1 wherein the eccentric weighing of the hub is due to eccentric mounting thereof.

12. In combination:
    a fishing line with two ends, the line including a weight at a first end thereof and at least one hook connected to the line adjacent the weight;
    a floater slidably connected to the line between the two ends, the floater including,
        a guide member with a pair of spaced guideways substantially aligned along a guide axis,
        a buoyant hub rotatably connected to the guide member between the guideways, the hub being freely rotatable about a rotation axis oriented perpendicular to the guide axis and being eccentrically weighted with respect to the rotation axis and further having a depression extending about the rotation axis;
    the line extending through a first of the guideways, around the hub along the depression and through a second of the guideways, whereby, when placed in a body of water with a depth less than the length of the line, the weight sinks to the bottom and pulls the line through the floater while the floater floats on the surface.

13. In combination:

a fishing line with two ends, the line including a weight at a first end thereof and at least one hook connected to the line adjacent the weight;

a floater slidably connected to the line between the two ends, the floater including, a guide member with a pair of spaced guideways, a oval-shaped buoyant hub rotatably and eccentrically connected to the guide member and being eccentrically rotatable about a rotation axis, the hub having a depression circumscribing the rotation axis;

the line extending through a first of the guideways, around the hub along the depression and through a second of the guideways, whereby, when cast into a body of water with a depth less than the length of the line, the weight sinks to the bottom and pulls the line through the floater while the floater remains floating on the surface, and when the hook is struck by a fish, tension applied to the line thereby causes the hub to eccentrically rotate abut the axis while still floating on the surface, thereby to cause ripples in the water to indicate a strike.

14. The invention of claim 13 wherein the guideways are substantially aligned along a guide axis and the hub is located between the guideways and in alignment with the guide axis.

* * * * *

UNITED STATES PATENT AND TRADEMARK OFFICE
CERTIFICATE OF CORRECTION

PATENT NO. : 5,235,776          Page 1 of 4
DATED : August 17, 1993
INVENTOR(S) : Harry A. Backus It is certified that error appears in the above-indentified patent and that said Letters Patent is hereby corrected as shown below:

Column 2, line 48, "us" should be --use--.

Column 5, line 34, "locate" should be --located--.

In the Abstract, line 17, "weighing" should be --weighting--.

Column 2, line 19, "weighing" should be --weighting--.

Column 2, line 25, "weighing" should be --weighting--.

Column 3, line 46, "weighing" should be --weighting--.

Column 3, line 52, "weighing" should be --weighting--.

Column 3, line 54, "weighing" should be --weighting--.

UNITED STATES PATENT AND TRADEMARK OFFICE
CERTIFICATE OF CORRECTION

PATENT NO. : 5,235,776
DATED : August 17, 1993
INVENTOR(S) : Harry A. Backus

It is certified that error appears in the above-indentified patent and that said Letters Patent is hereby corrected as shown below:

Column 3, line 57, "weighing" should be --weighting--.

Column 3, line 62, "weighing" should be --weighting--.

Column 4, line 54, "weighing" should be --weighting--.

Column 4, line 61, "weighing" should be --weighting--.

Column 4, line 66, "weighing" should be --weighting--.

Column 5, line 1, "weighing" should be --weighting--.

Column 5, line 36, "weighing" should be --weighting--.

UNITED STATES PATENT AND TRADEMARK OFFICE
CERTIFICATE OF CORRECTION

PATENT NO. : 5,235,776
DATED : August 17, 1993
INVENTOR(S) : Harry A. Backus

It is certified that error appears in the above-indentified patent and that said Letters Patent is hereby corrected as shown below:

Column 5, line 37, "weighing" should be --weighting--.

Column 5, line 45, "weighing" should be --weighting--.

Column 6, line 29, "weighing" should be --weighting--.

Column 6, line 37, "weighing" should be --weighting--.

Column 6, line 41, "weighing" should be --weighting--.

UNITED STATES PATENT AND TRADEMARK OFFICE
CERTIFICATE OF CORRECTION

PATENT NO. : 5,235,776
DATED : August 17, 1993
INVENTOR(S) : Harry A. Backus

It is certified that error appears in the above-indentified patent and that said Letters Patent is hereby corrected as shown below:

Column 6, line 44, "weighing" should be —weighting—.

Signed and Sealed this

Twentieth Day of December, 1994

Attest:

BRUCE LEHMAN

Attesting Officer     Commissioner of Patents and Trademarks